United States Patent
Linzer et al.

(10) Patent No.: US 10,366,301 B1
(45) Date of Patent: Jul. 30, 2019

(54) BLOCK BASED NON-MAXIMUM SUPPRESSION

(71) Applicant: Ambarella, Inc., Santa Clara, CA (US)

(72) Inventors: Elliot N. Linzer, Bergenfield, NY (US);
Guy Rapaport, Sunnyvale, CA (US);
Leslie D. Kohn, Saratoga, CA (US); Yu Wang, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 15 days.

(21) Appl. No.: 15/605,411

(22) Filed: May 25, 2017

Related U.S. Application Data

(60) Provisional application No. 62/500,060, filed on May 2, 2017.

(51) Int. Cl.
*G06K 9/46* (2006.01)
*G06K 9/62* (2006.01)

(52) U.S. Cl.
CPC ......... *G06K 9/4604* (2013.01); *G06K 9/4642* (2013.01); *G06K 9/6202* (2013.01)

(58) Field of Classification Search
CPC combination set(s) only.
See application file for complete search history.

(56) References Cited

U.S. PATENT DOCUMENTS

| | | | |
|---|---|---|---|
| 9,165,369 B1* | 10/2015 | Zhang | G06T 7/0081 |
| 9,514,366 B2* | 12/2016 | Schweid | G06K 9/00624 |
| 10,002,430 B1* | 6/2018 | Mundhenk | G06T 7/0042 |
| 2007/0269107 A1* | 11/2007 | Iwai | G06K 9/50 |
| | | | 382/168 |
| 2011/0103657 A1* | 5/2011 | Kang | G06K 9/4609 |
| | | | 382/128 |
| 2015/0222859 A1* | 8/2015 | Schweid | G06K 9/00624 |
| | | | 348/148 |
| 2016/0371561 A1* | 12/2016 | Jaber | G06K 9/52 |
| 2017/0011520 A1* | 1/2017 | Mathew | G06K 9/6218 |
| 2017/0309001 A1* | 10/2017 | Zagaynov | G06T 5/005 |

* cited by examiner

*Primary Examiner* — Anand P Bhatnagar
(74) *Attorney, Agent, or Firm* — Christopher P. Maiorana, PC

(57) ABSTRACT

A method of object or feature detection. The method includes the steps of (A) receiving an array of scores and (B) applying a block based non-maximum suppression technique to the array of scores.

19 Claims, 10 Drawing Sheets

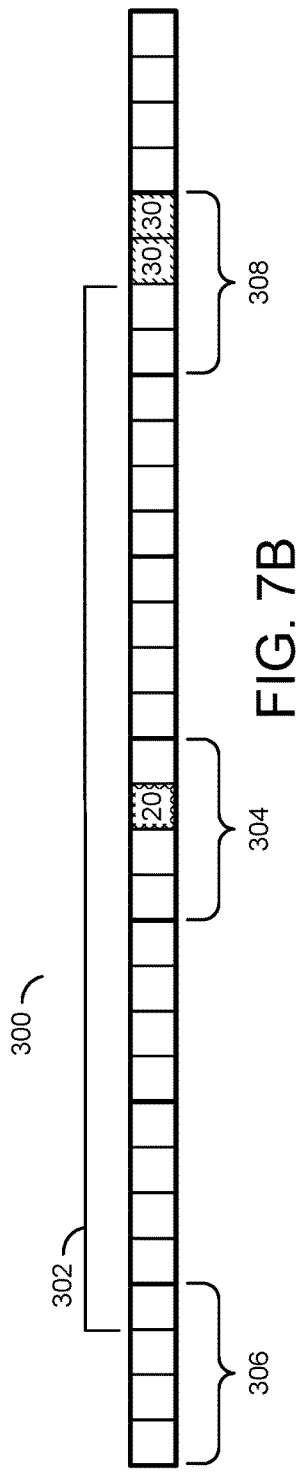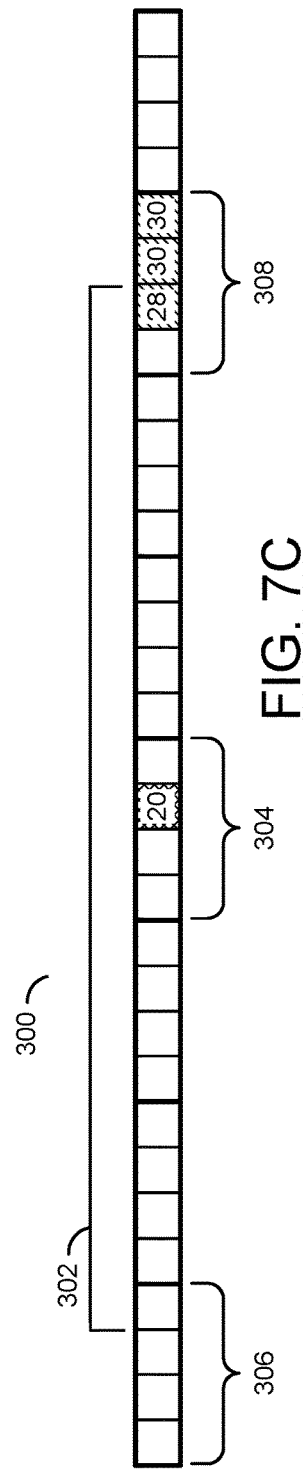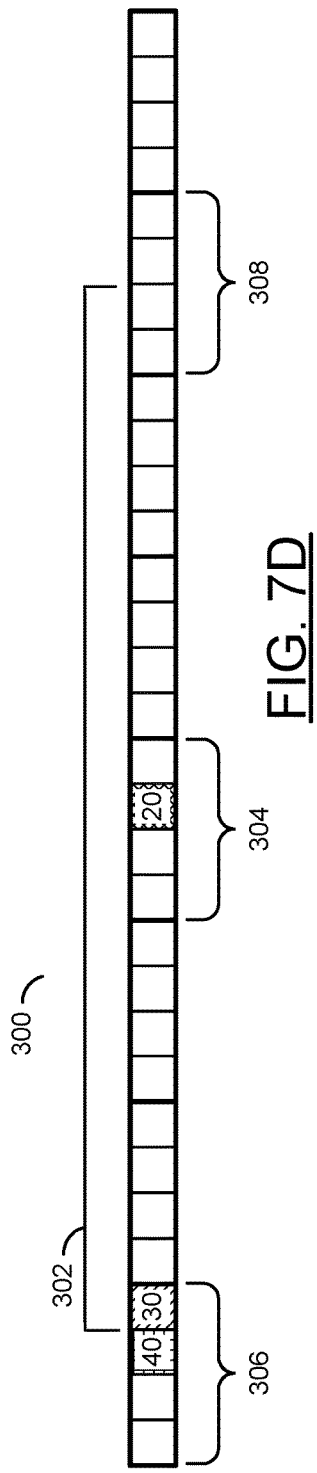

BLOCK BASED NON-MAXIMUM SUPPRESSION

This application relates to U.S. Provisional Application No. 62/500,060, filed May 2, 2017, which is incorporated by reference in its entirety.

FIELD OF THE INVENTION

The invention relates to computer vision generally and, more particularly, to a method and/or apparatus for implementing a block based non-maximum suppression.

BACKGROUND

Non-maximum suppression is an important process used in object or feature detection. For example, an object detection algorithm may compute a score at an image pixel associated with the likelihood that pixel is the upper-left corner of a rectangle of a given size that contains the desired object. If the score is high enough, the detection produces a positive result. There could be many high scores for rectangles that are close to one another and that all contain or partially contain the same desired object. In that case, the detection algorithm should detect each object only once. The detection algorithm can do that by suppressing scores that are not locally maximum. In terms of computations and memory access, conventional non-maximum suppression techniques can be very costly.

It would be desirable to implement a block based non-maximum suppression.

SUMMARY

The invention concerns a method of object or feature detection including the steps of (A) receiving an array of scores and (B) applying a block based non-maximum suppression technique to the array of scores.

BRIEF DESCRIPTION OF THE FIGURES

Embodiments of the invention will be apparent from the following detailed description and the appended claims and drawings in which:

FIGS. 7A-7D are diagrams illustrating block-based approximate non-maximum suppression examples using the 1-D array of scores of FIG. 6;

DETAILED DESCRIPTION OF THE EMBODIMENTS

Embodiments of the present invention include providing block based non-maximum suppression that may (i) lower computation costs, (ii) lower memory bandwidth demands, (iii) lower caching demands, (iv) reduce storage size of scores, (v) be adapted to provide a hybrid exact non-maximum suppression scheme, (vi) be adapted to provide an approximate non-maximum suppression scheme, and/or (vii) be implemented as one or more integrated circuits.

Figure 1:
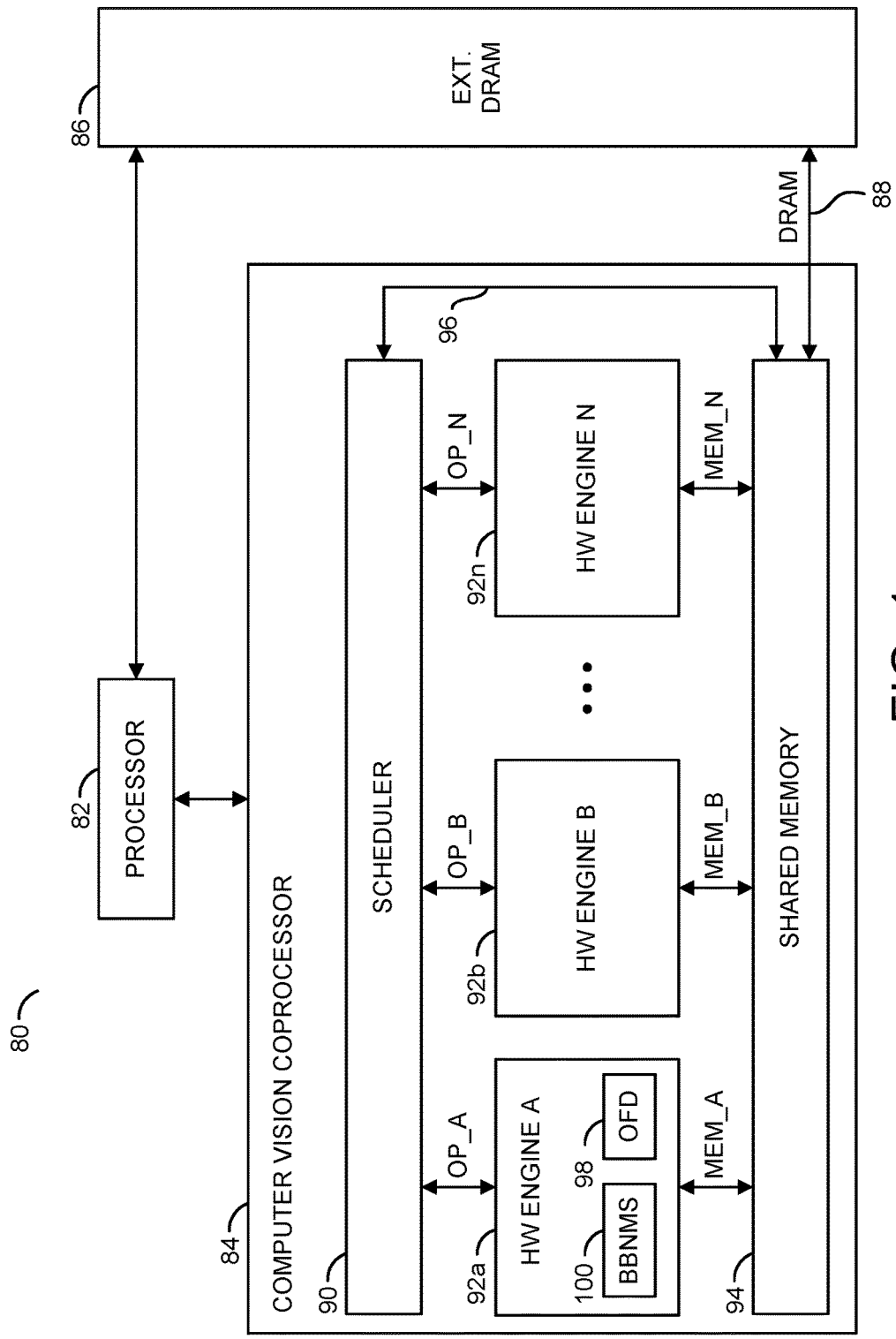
FIG. 1 is a diagram illustrating a context in which a block-based non-maximum suppression technique may be implemented in accordance with an embodiment of the invention.

Referring to FIG. 1, a diagram of a system 80 is shown illustrating a context in which a block based approximate non-maximum suppression approach in accordance with an example embodiment of the invention may be implemented. The system (or apparatus) 80 may be implemented as part of a computer vision system. In various embodiments, the system 80 may be implemented as part of a camera, a computer, a server (e.g., a cloud server), a smart phone (e.g., a cellular telephone), a personal digital assistant, or the like.

In an example embodiment, the system 80 generally comprises a block (or circuit) 82, a block (or circuit) 84, a block (or circuit) 86 and a memory bus 88. The circuit 84 generally comprises a block (or circuit) 90, one or more blocks (or circuits) 92a-92n, a block (or circuit) 94 and a path 96. One or more of the circuits 92a-92n may include a block (or circuit) 98 and/or a block (or circuit) 100.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 94.

The circuit 82 may implement a processor circuit. In some embodiments, the processor circuit 82 may be a general purpose processor circuit. The processor circuit 82 may be operational to interact with the circuit 84 and the circuit 86 to perform various processing tasks.

The circuit 84 may implement a coprocessor circuit. The coprocessor circuit 84 is generally operational to perform specific (e.g., computer vision related) processing tasks as arranged by the processor circuit 82. In various embodiments, the coprocessor 84 may be implemented solely in hardware. The coprocessor 84 may directly execute a data flow directed to feature extraction and matching, including block based non-maximum suppression, generated by software that specifies processing tasks.

The circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 84.

The circuit 90 may implement a scheduler circuit. The scheduler circuit 90 is generally operational to schedule tasks among the circuits 92a-92n to perform a variety of computer vision tasks as defined by the processor circuit 82. Individual tasks may be allocated by the scheduler circuit 90 to the circuits 92a-92n. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. In some configurations, the hardware engines 92a-92n may operate in parallel and independently of each other. In other configurations, all or a portion of the hardware engines 92a-92n may operate collectively to perform allocated tasks. The hardware engines 92a-92n may be implemented as one or more of homogenous processing resources (e.g., all circuits 92a-92n may have the same capabilities) or heterogeneous processing resources (e.g., two or more circuits 92a-92n may have different capabilities).

In various embodiments, the circuits 92a-92n may implement one or more operators. The operators performed by the hardware engines 92a-92n may include, but are not limited to, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a block based non-maximum suppression operator, a gather operator, a scatter operator, a statistics operator, a classifier operator, an integral image operator, comparison operators, indexing operators, a pattern matching operator, a feature extraction operator, a feature detection operator, an object detection operator, a score generating operator, a block reduction operator, and an upsample operator. In various embodiments, the hardware engines 92a-92n may be implemented solely as hardware circuits.

The circuit 94 may implement a shared memory circuit. The shared memory 94 is generally operational to store all, a portion, or portions of the multidimensional arrays (or vectors) of input data elements and output data elements utilized and/or generated by the hardware engines 92a-92n. The input data elements may be received from the DRAM circuit 86 via the memory bus 88. The output data elements may be sent to the DRAM circuit 86 via the memory bus 88.

The path 96 may implement a transfer path internal to the coprocessor 84. The transfer path 96 is generally operational to move data from the scheduler circuit 90 to the shared memory 94. The transfer path 96 may also be operational to move data from the shared memory 94 to the scheduler circuit 90.

The circuit 98 may implement a score map generating scheme. In an example, the circuit 98 may implement an object and/or feature detection operation that may produce an array (or map) of scores. In an example, the array of scores may correspond to a portion of pixels of an image containing one or more objects or features. In various embodiments, the scores may have a one-to-one correspondence (mapping) with the pixels. In an example, the scores may represent a likelihood that a corresponding pixel is a reference point for a region of a predetermined size containing a particular object or feature.

The circuit 100 may implement a block based non-maximum suppression scheme in accordance with embodiments of the invention. In various embodiments, the circuit 100 may be configured to perform a block based approximate non-maximum suppression scheme and/or a block based exact non-maximum suppression scheme in accordance with the invention. In various embodiments, the block based non-maximum suppression scheme may be performed according to the following implementation descriptions.

Figure 2:
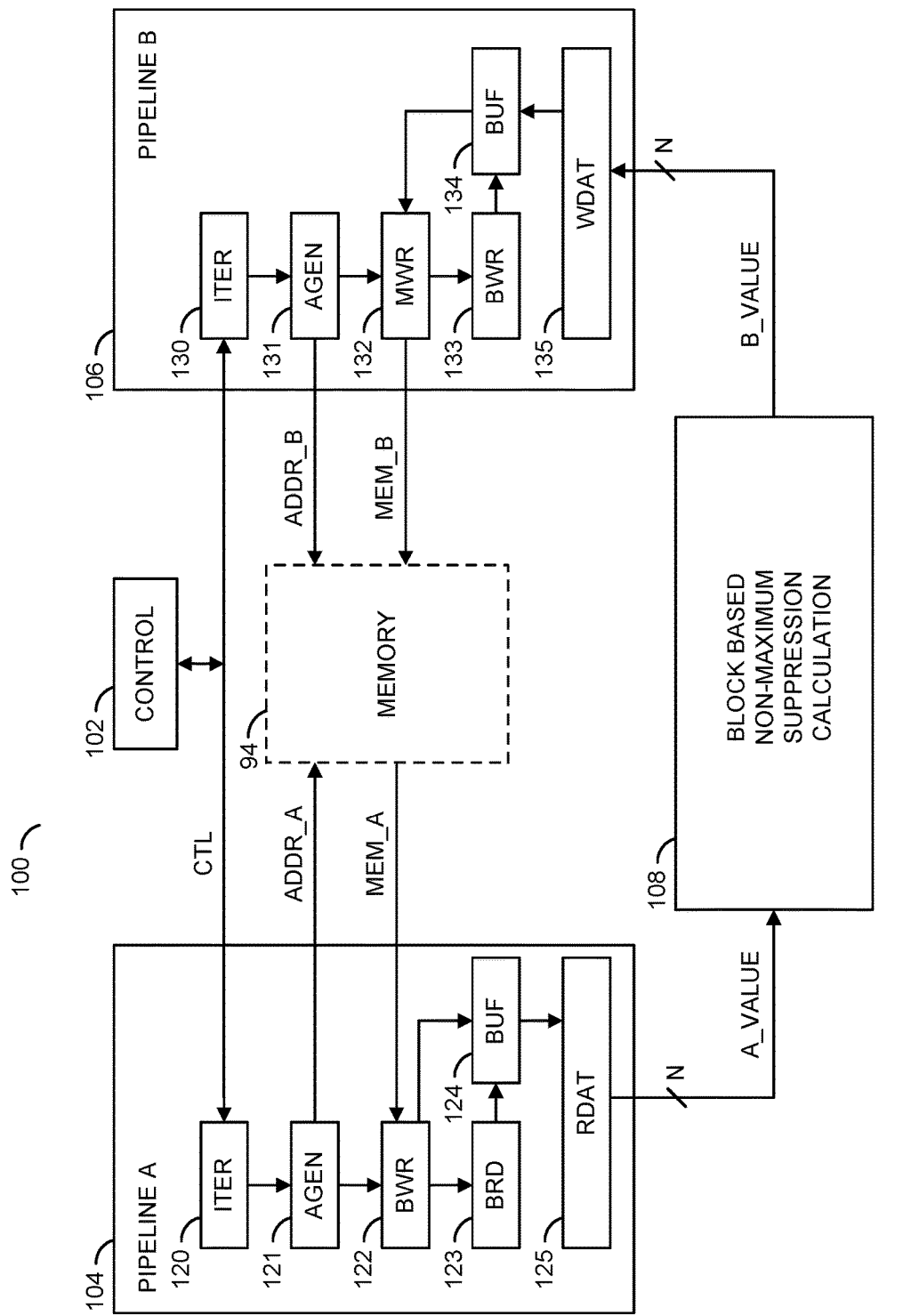
FIG. 2 is a diagram illustrating an example implementation of a block-based non-maximum suppression operation circuit of FIG. 1.

Referring to FIG. 2, a diagram is shown illustrating an example implementation of the block based non-maximum suppression operation circuit 100 of FIG. 1 in accordance with an example embodiment of the invention. In an example, the block based non-maximum suppression operation circuit 100 may comprise a block (or circuit) 102, a block (or circuit) 104, a block (or circuit) 106, and a block (or circuit) 108. In various embodiments, the circuits 102-108 are implemented solely in hardware. The circuit 102 may implement a control circuit. The circuit 104 may implement a first data pipeline (e.g., PIPELINE A). The circuit 106 may implement a second data pipeline (e.g., PIPELINE B). The circuit 108 may implement a block based non-maximum suppression calculation circuit. The circuit 108 may be configured to perform a block based approximate non-maximum suppression and/or a block based exact non-maximum suppression operations.

A signal (e.g., CTL) may be exchanged among the circuit 102, the circuit 104, and the circuit 106. The signal CTL may convey control information. A signal (e.g., ADDRA) may be generated by the circuit 104 and presented to the memory circuit 94. The signal ADDRA may carry address information used to read the input data values for an operand array (e.g., array A). In an example, the array A may comprise an array (or map) of scores. In an example, the array of scores may correspond to a portion of pixels of an image containing one or more objects or features. In various embodiments, the scores may have a one-to-one correspondence (mapping) with the pixels. In an example, the scores may represent a likelihood that a corresponding pixel is a reference point for a region of a predetermined size containing a particular object or feature.

A signal (e.g., ADDRB) may be generated by the circuit 106 and received by the memory circuit 92. The signal ADDRB may convey address information used to write output data values for a resulting output array or arrays (e.g., array B). The signal MEM_A may be received by the circuit 104. The signal MEM_B may be generated by the circuit 106. The signal MEM_A received by the circuit 104 may carry the input data values of the operand array A. The signal MEM_B generated by the circuit 106 may carry the output data values of the array B.

A signal (e.g., A_VALUE) may be generated by the circuit 104 and received by the circuit 108. The signal A_VALUE may transfer fetched array A data (e.g., the fetched input data values of array A) to the circuit 108. A signal (e.g., B_VALUE) may be generated by the circuit 108. The signal B_VALUE may convey output data values (e.g., Max_scare and Max_index values) of a result of the block based non-maximum suppression operation performed by the circuit 100. The output data values may be conveyed in different ways, depending on implementation and/or application. In an example, the output data may comprise a list of positions of valid local maxima within the score map image. In another example, the output data may comprise a binary map (e.g., specifying for each location whether the location is a valid or non-valid local maxima).

The circuit 102 is generally operational to setup, control and provide centralized scheduling for the operations in the circuit 104 and the circuit 106. The setup, control and scheduling may be provided by the control information presented in the signal CTL. Feedback for the operations in the circuit 104 and the circuit 106 may be presented back to the control circuit 102 in the signal CTL.

In various embodiments, the pipeline circuit 104 may operate on array data. The pipeline circuit 104 may be configured to fetch the input data values of the input array from the memory circuit 94 in the signal MEM_A. The fetched array data may be presented in the signal A_VALUE to the circuit 108. The pipeline circuit 104 generally comprises a block (or circuit) 120, a block (or circuit) 121, a block (or circuit) 122, a block (or circuit) 123, a block (or circuit) 124, and a block (or circuit) 125. In various embodiments, the circuits 120-125 may be implemented solely in hardware. The circuit 120 may exchange the signal CTL with the circuit 102. The circuit 121 may generate the signal ADDRA. The signal MEM_A may be received by the circuit 122. The signal A_VALUE may be generated by the circuit 125.

The circuit 106 may implement a second pipeline circuit. In various embodiments, the pipeline circuit 106 may operate on array data. The pipeline circuit 106 may be configured to write the output data values of the array B received from the circuit 108 to the memory circuit 94 via the signal MEM_B. The array B data may be presented by the circuit 108 in the signal B_VALUE. The pipeline circuit 106 generally comprises a block (or circuit) 130, a block (or circuit) 131, a block (or circuit) 132, a block (or circuit) 133, a block (or circuit) 134, and a block (or circuit) 135. In various embodiments, the circuits 130-135 may be implemented solely in hardware. The circuit 130 may exchange the signal CTL with the circuit 102. The circuit 131 may generate the signal ADDRB. The signal MEM_B may be presented by the circuit 132. The signal B_VALUE may be received by the circuit 135.

The circuit 108 may implement a block based non-maximum suppression calculation circuit. The circuit 108 is generally operational to reduce blocks of scores received in the signal A_VALUE to a small data set and determine if each score is an approximate local maximum. The resulting output data may be presented in the signal B_VALUE.

Each of the circuits 120 and 130 may implement an iteration (ITER) circuit. The iteration circuits 120 and 130 are generally operational to generate respective sequences of values used in the current block based non-maximum suppression operation. In an initial part of a block based non-maximum suppression operation, the iteration circuits 120 and 130 specify an output array to be produced. Next, the input array may be broken down into a sequence of input values used to produce the output array. The iteration circuits 120 and 130 may communicate with the control circuit 102 to make sure that data is available before proceeding. The availability of the data generally avoids pipeline hangs and keeps the two pipelines 104 and 106 in synchronization.

Each of the circuits 121 and 131 may implement an address generator (AGEN) circuit. The address generators 121 and 131 may be operational to initiate data fetches received from and writes presented to the memory circuit 94 via the signals MEM_A and MEM_B, respectively, using a local buffer 124 and/or a local buffer 134, respectively. The address generator 121 may present addresses in the signal ADDR_A for fetching the input data of array A. The address generator 131 may present addresses in the signal ADDRB for writing the output data of array B. The address generators 121 and 131 may also keep track of what data is in the local buffers 124 and 134, and annotate each array with appropriate buffer location information.

The circuit 122 may implement a buffer write (BWR) circuit. The buffer write circuit 122 is generally operational to (i) receive data from the memory circuit 94 via the signals MEM_A and (ii) write the received data into the respective local buffer circuit 124 at the appropriate locations. The circuit 132 may implement a memory write (MWR) circuit. The memory write circuit 132 is generally operational to (i) receive data from the respective local buffer circuit 134 and (ii) write the received data into the memory circuit 94 at the appropriate locations via the signals MEM_B.

The circuits 123 and 133 may implement a buffer read (BRD) circuit and a buffer write (BWR) circuit, respectively. The buffer read circuit 123 is generally operational to read data out of the respective local buffer or buffers 124. The buffer write circuit 133 is generally operational to write data into the respective local buffer or buffers 134. The local buffers 124 and 134 generally reduce bandwidth to the memory 94. The address generator 121 may suppress fetching of data that is already present in the local buffer 124.

Each of the circuits 124 and 134 may implement a local buffer (BUF) circuit. The local buffer circuits 124 and 134 are generally operational to temporarily store (or buffer) the data written by the buffer write circuits 122 and 133, respectively. In some embodiments, the local buffers 124 and 134 may implement a random access capability.

The circuits 125 and 135 may implement a read data (RDAT) circuit or write data (WDAT) circuit, respectively. The read data circuit 125 is generally operational to send the data read out of the pipeline 104 to the block based non-maximum suppression calculation circuit 108. The write data circuit 135 is generally operational to receive the data presented by the block based non-maximum suppression calculation circuit 108 to the respective pipeline 106. The read data circuit 125 may transfer the buffered input data values of the first array A in the signal A_VALUE. The read data circuit 135 may transfer the output values generated by the circuit 108 to the pipeline B in the signal B_VALUE.

Figure 3:
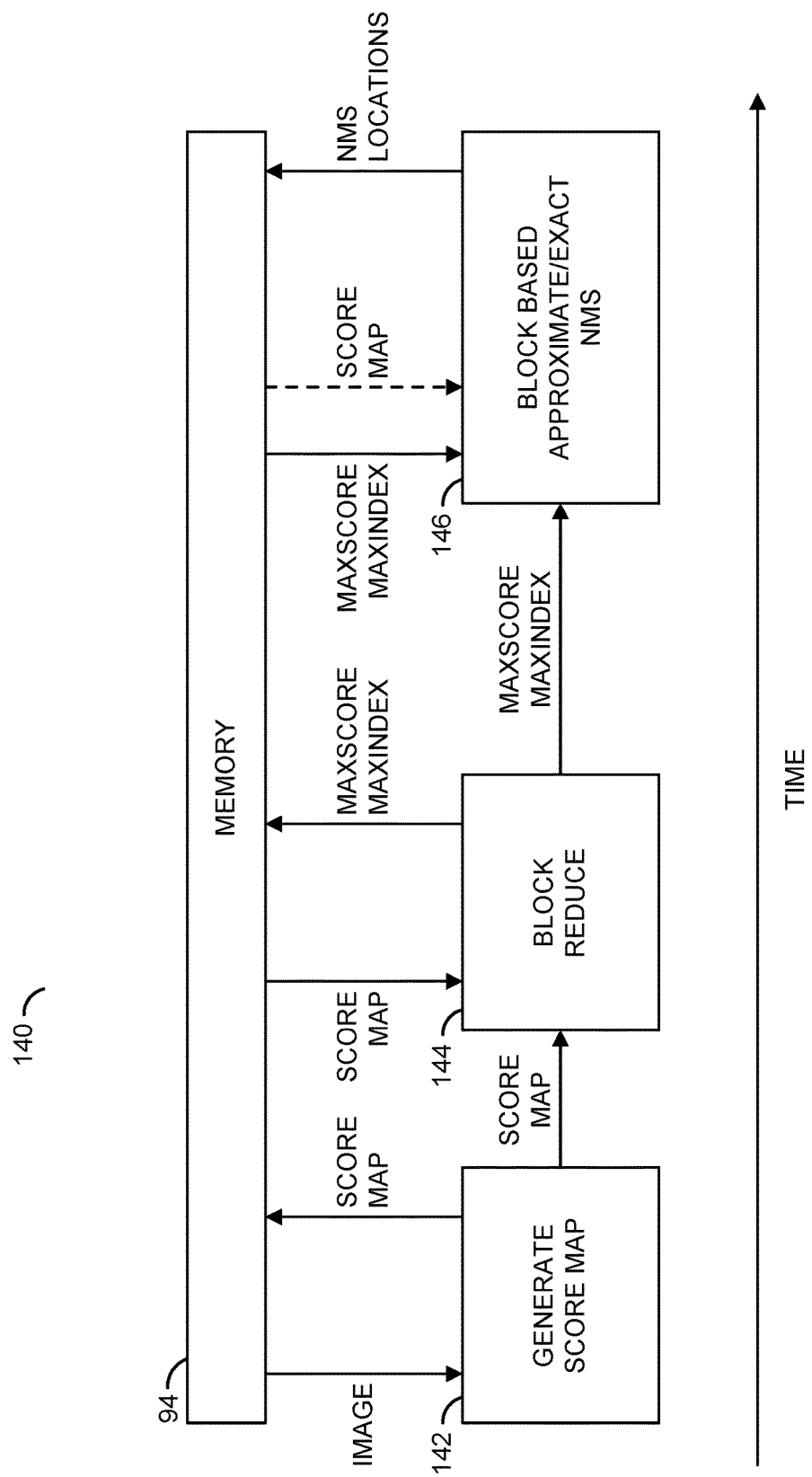
FIG. 3 is a diagram illustrating an example data flow in accordance with an example embodiment of the invention.

Referring to FIG. 3, a diagram is shown illustrating an example data flow 140 in accordance with an example embodiment of the invention. In an example, the data flow 140 may comprise a step (or stage) 142, a step (or stage) 144, and a step (or stage) 146. The step 142 may by configured to generate a score map. The step 144 may be configured to perform a block reduction operation. The step 146 may be configured to perform block based non-maximum suppression in accordance with an embodiment of the invention. In various embodiments, the steps 142-146 may implemented by one or more of the hardware engines 92a-92n. The steps 142-146 may be configured to exchange data directly and/or using the memory 94.

In an example, the step 142 may be configured to generate a score map from all or a portion of an image. In an example, the step 142 may retrieve image data from the memory 94, generate scores based on the image data, and store a score map (or array) back to the memory 94 or transfer the score map to a subsequent processing stage (e.g., the step 144). In an example, the image data may have been captured and processed in a separate image processing pipeline prior to being stored in the memory 94. In an example, the scores contained in the score map may represent a likelihood that a corresponding pixel in the image data is a reference point for a region of a predetermined size containing a particular object or feature. However, other scoring operations may be implemented accordingly to meet the design criteria of a particular implementation.

In the step 144, the score map may be retrieved from the memory 94 or received from a previous processing stage (e.g., the step 142). The scores may be grouped into a number of blocks, each having a predefined number of scores and predefined dimensions. Each of the blocks may be analyzed to identify a maximum score in each block and a location of the maximum score within each block. A pair of values (e.g., Max_score and Max_index) may be generated for each of the blocks. The pairs of values Max_score and Max_index may contain the maximum score and the location of the maximum score within each respective block. In an example, the pairs of values Max_score and Max_index may be written back to the memory 94 for use in subsequent processing. In another example, the pairs of values Max_score and Max_index may be transferred directly to another stage (e.g., the step 146) for use in subsequent processing.

In the step 146, a block based non-maximum suppression operation in accordance with one or more embodiments of the invention may be performed. In an example, the step (or stage) 146 may be configured to perform a block based approximate non-maximum suppression operation using block information (e.g., Max_score and Max_index values) received directly from a previous processing step (or stage) or retrieved from the memory 94. In an example, the step 146 may be configured to generate output data in response to the block information. In an example, the output data may comprise a list of positions of valid local maxima within the score map for the image processed in the step 142. In another example, the output data may comprise a binary map (e.g., specifying for each location whether the location is a valid or non-valid local maxima). In an example, the step 146 may write the output data back to the memory 94 for use in subsequent processing.

In another example, the step 146 may be configured to perform a block based exact non-maximum suppression operation using (i) block information (e.g., Max_score and Max_index values) received either directly from a previous processing step (or stage) or retrieved from the memory 94 and score map data retrieved from the memory 94. In an example, the step 146 may be configured to generate output data in response to the block information and the individual scores in the score map. As in the examples above, the output data may comprise either (i) a list of positions of valid local maxima within the score map for the image processed in the step 142 or (ii) a binary map (e.g., specifying for each location whether the location is a valid or non-valid local maxima). The step 146 may write the output data back to the memory 94 for use in subsequent processing.

Figure 4:
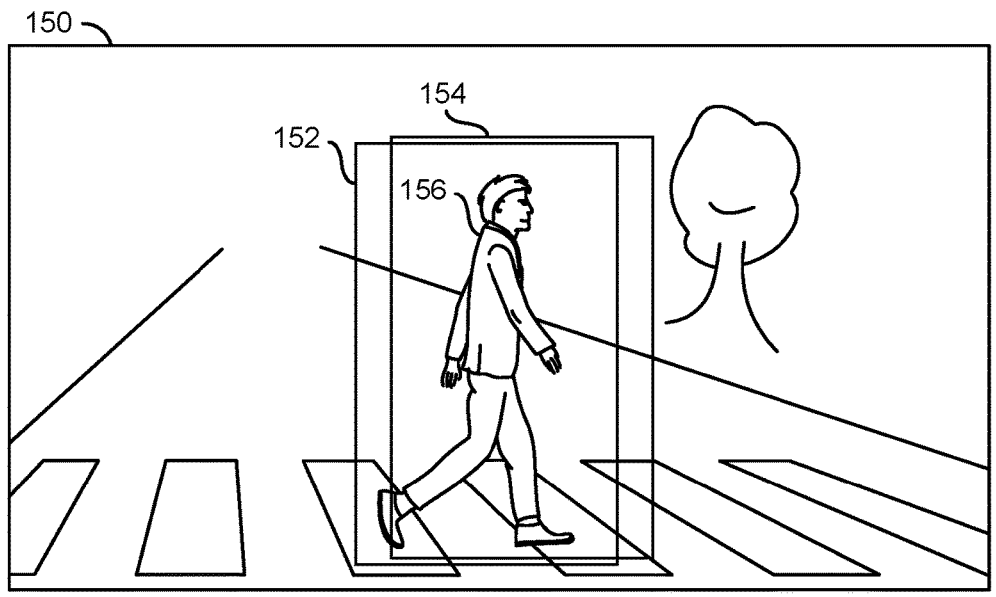
FIG. 4 is a diagram illustrating a single object potentially detected of as two objects.

Referring to FIG. 4, a diagram of a picture 150 is shown illustrating a single object that potentially may be detected as two objects. In an example, the picture 150 may represent a still image or a video frame. Following application of an object detection routine, two candidate rectangles 152 and 154 may be identified as containing a detected object (e.g., a pedestrian 156). Both the rectangle 152 and the rectangle 154 could show a high score for detecting the pedestrian 156. However, an object detection algorithm that detects two pedestrians, one associated with the rectangle 154 and one associated with the rectangle 152, will have, in a sense, failed. It would be better for the object detection algorithm to take the rectangle with the higher score. For example, the rectangle 152 might be the better choice in this case, since some of the right foot of the pedestrian 156 is not in the rectangle 154.

In general, there may be many high scores associated, respectively, with multiple rectangles that are overlapping or close to one another and that all contain or partially contain the same desired object. In order for the detection algorithm to detect each object only once, the detection algorithm may be configured to suppress scores that are not locally maximum. Formally, non-maximum suppression may be described as suppressing scores that are not the maximum score in some local range, and generating a negative result for the suppressed scores. In an example of a two dimensional image, the local range may be defined as +/−11×+/−11 around a center sample (e.g., a 23×23 array). In the example of FIG. 4, if the upper-left corners of the rectangle 152 and the rectangle 154 differ by 11 or fewer pixels in both the vertical and the horizontal directions, the rectangle (152 or 154) with the lower score will not result in a positive detection.

In terms of computations and memory access, conventional non-maximum suppression techniques can be very costly. For example, if non-maximum scores in a 23×23 region are to be suppressed, then the center score needs to be compared to 23*23=529 scores. Besides the actual computations, the memory bandwidth can be very high and/or need expensive caches. In the same example, if the scores are stored in an external memory (e.g., DRAM) the following options (among others) would be available:

1. Load 529 scores for each non-max suppression; and
2. Use a local cache big enough for 22 lines of the picture, and process in raster-scan order.

The first option uses a lot of memory bandwidth. The second option uses an expensive cache. It is desirable to have non-maximum suppression methods or approximate non-maximum suppression methods with lower computation costs, lower memory bandwidth needs, and/or lower caching demands.

Figure 5:
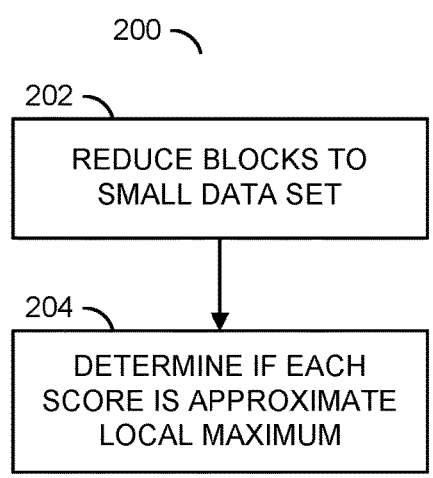
FIG. 5 is a diagram illustrating an example of a reduced cost block-based approximate non-maximum suppression process in accordance with an example embodiment of the invention.

Referring to FIG. 5, a flow diagram of a process 200 is shown illustrating a reduced-cost block-based approximate non-maximum suppression scheme in accordance with an example embodiment of the invention. In an example, the process (or method) 200 may comprise a step (or stage) 202 and a step (or stage) 204. In various embodiments, the step 202 may comprise reducing blocks of scores to a small data set and the step 204 may comprise determining whether each score is an approximate local maximum.

In the step 202, the data is divided into blocks, each block containing a predetermined number (e.g., K) of scores and having a predetermined size or dimensions (e.g., 1×K, N×N, N×M, etc.). For each block, the scores may be converted (reduced) into a smaller representation comprising (i) a maximum score (e.g., Max_score) of the block and (ii) an index (e.g., Max_index) identifying the location within the block of the maximum score. The step 202 may be more clearly illustrating using the following 1-dimensional examples:

EXAMPLE 1

K=2, data=100, 90
Max_score=100
Max_index=0 (counting locations within a block from left to right starting from 0).

EXAMPLE 2

K=2, data=90, 100
Max_score=100
Max_index=1

EXAMPLE 3

K=4, data=100, 90, 110, 70
Max_score=110
Max_index=2.

In the step 204, a determination is made whether each score is the approximate local maximum or not. In various embodiments, a predetermined suppression range (e.g., R) may be set and all the blocks fully or partially within the suppression range R are considered to determine whether each score is the approximate local maximum. A number of methods may be used to implement the step 204. A first (simple) method may just use blocks that are partially in range based on how many scores in the suppression range R are in the block. A second (ambiguous negative) method may declare a center sample of the suppression range R as the local maximum if, given the information about each block, the center sample necessarily has the maximum score. A third (ambiguous positive) method may declare the center sample of the suppression range R as the local maximum if, given the information about each block, the center sample may be the maximum score. A fourth method may switch between the ambiguous positive and the ambiguous negative methods based on how many scores in a block, which is only partially within the suppression range, are in the suppression range. However, other methods of determining whether each score is the approximate local maximum may be implemented to meet the design criteria of a particular implementation.

Figure 6:
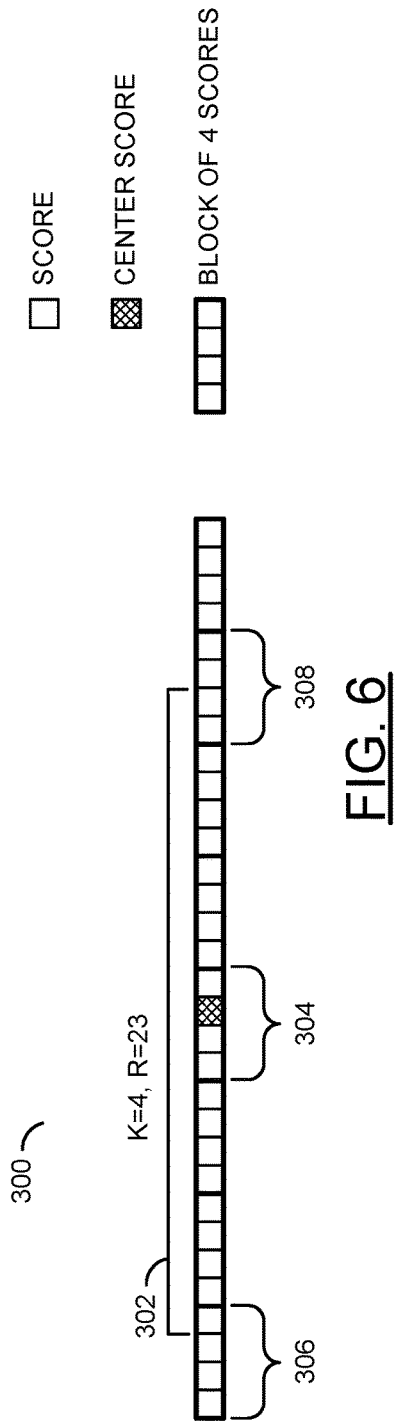
FIG. 6 is a diagram illustrating an example 1-D array of scores.

Referring to FIG. 6, a diagram of a 1-D array 300 is shown illustrating a block based non-maximum suppression process in accordance with an example embodiment of the invention. In general, all blocks in a suppression range R are considered when determining whether each score is the approximate local maximum. In an example, a 1-D array 300 having blocks containing four scores (e.g., K=4) and a suppression range 302 of twenty-three scores (e.g., R=23) may be defined. In the 1-D array 300, the score being examined is the center score (cross-hatch shading) in the range 302. In the example shown in FIG. 6, the center score (or sample) is score 2 (reading from left to right staring from 0) in a block 304. The suppression range 302 includes a portion (e.g., score 3) of a partially in range block 306 on the left and a portion (e.g., scores 0 and 1) of a partially in range block 308 on the right.

In a first method (simple), blocks that are partially within the suppression range 302 are used based on how many scores in the block are within the suppression range 302. For example, if a rule is defined that a block with two or more scores in the suppression range is included, then the left partially in range block 306 would not be used and the right partially in range block 308 would be used. When the simple method is implemented, the current score is determined to be the local maximum if all of the following are true:

1) The current score is the maximum within its block, as indicated by Max_index; and
2) The block that contains the current score has the highest Max_score of all blocks that have two or more scores in the suppression range 302.

Figure 7A:
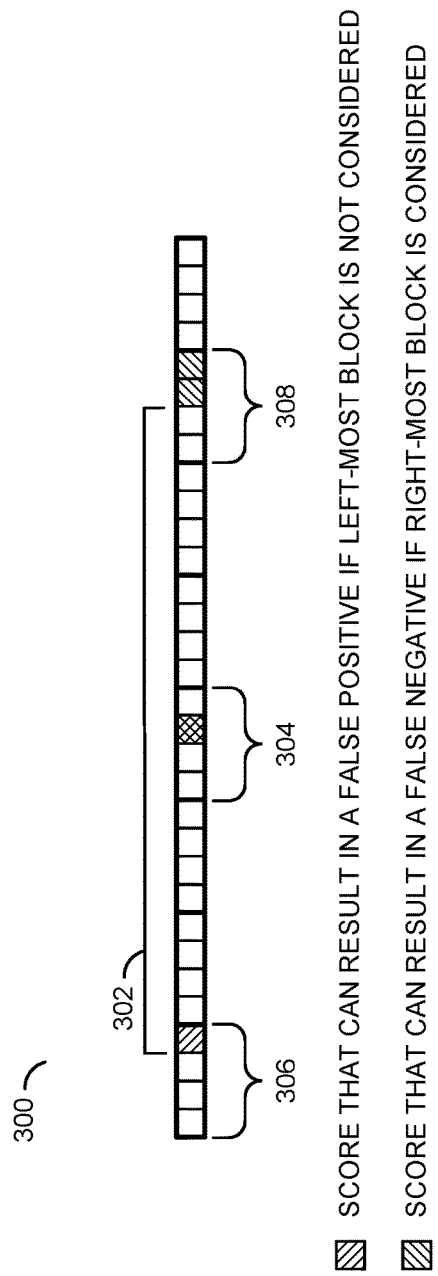

Referring to FIG. 7A, a diagram of the 1-D array 300 is shown illustrating conditions where the simple block-based approximate non-maximum suppression method in accordance with an example embodiment of the invention may yield results that differ from the true (exact) non-maximum suppression method. The simple method, while often a good approximation, may yield results that differ from a true (exact) non-maximum suppression method if one of the following conditions is true:

1) if a block not considered, because the block is not enough in range, contains the true maximum, a false positive may Occur; or 2) if a block considered is used to suppress the current score, even though the large score from that block is not actually in range, a false negative may occur.

If the left-most block 306 is not considered, the failure to consider the shaded block score (e.g., score 3) may result in a false positive. If the rightmost block 308 is considered, taking into account either of the two shaded block scores (e.g., score 2 or score 3) may result in a false negative.

In a second method (ambiguous negative), the center sample (current score) is declared as the local maximum if, given the information about each block, the center sample (current score) necessarily is the maximum. The second method may be viewed as a special case of the method described above (e.g., in connection with FIG. 7A), where the rule is defined such that a block with one or more scores in the suppression range is included.

In embodiments utilizing the second method, the current score is declared the local maximum if:

1) the current score is the maximum within its block (e.g., the block 304), as indicated by Max_index; and
2) the block 304, which contains the current score, has the highest Max_score of all blocks that are partially or fully within the suppression range 302.

Referring to FIG. 7B, a diagram of the 1-D array 300 is shown illustrating conditions where a block-based approximate non maximum suppression methods in accordance with example embodiments of the invention may yield a false negative result when the second method (e.g., ambiguous negative) is used. The second method (described above) cannot produce a false positive result. However, a false negative result may be produced. For example, if (as shown in FIG. 7B) the center score is 20, scores 2 and 3 in block 308 are 30, and all other scores are 10, the second condition that the block containing the current score have the highest Max_score of all blocks that are partially or fully in the suppression range will not be met, because a block partially in the suppression range 302 (e.g., block 308) has a score of 30 which is greater than the center score of 20. Thus, using the ambiguous negative method, the center score will not be declared a local maximum even though the center score (e.g., 20) is greater than all other scores (e.g., 10) in the suppression range 302.

Referring to FIG. 7C, a diagram of the 1-D array 300 is shown illustrating conditions where a block-based approximate non-maximum suppression method in accordance with example embodiments of the invention using the ambiguous negative method correctly marks a current score as non-maximum based on a score in a block that is partially in the suppression range. When the ambiguous negative method is utilized, the scores in all the blocks associated with the suppression range 302, even the blocks only partially in the suppression range 302, need to be lower than the center score (e.g., center score is greater than Max_score of all the blocks) for the center score to be marked the local maximum. In an example, the center score may be 20, score 1 in block 308 may be 28, scores 2 and 3 in block 308 may be 30, and all other scores may be 10. Block 308 is only partially in the suppression range 302, has a score (e.g., score 1) that is in the suppression range 302, and score 1 of block 308 has a value (e.g., 28) that is greater than the center score (e.g., 28>20). Because score 1 of block 308 is in the suppression range 302, the center score is correctly marked as non-maximum.

Referring to FIG. 7D, a diagram of the 1-D array 300 is shown illustrating conditions where a block-based approximate non-maximum suppression methods in accordance with example embodiments of the invention may yield an ambiguous positive result. In an example, the center score may be 20, score 2 in block 306 may be 40, score 3 in block 306 may be 30, and all other scores may be 10. In a third method (ambiguous positive), the center score (or current score) is declared as the local maximum if, given the information about each block, the center score may be the maximum score. The third method, unlike the previous two methods, uses Max_index of the blocks that are partially within the suppression range. Specifically, if and only if the Max_index refers to a score that is in the suppression range, the score referred to by Max-index is used to declare the center score not the local maximum. In embodiments utilizing the third method, the current score is declared the local maximum if:

1) The center score is the maximum within its block (e.g., the block 304), as indicated by Max_index;
2) The block 304 that contains the center score has the highest Max_score of all blocks that are fully in the suppression range 302; and
3) Any block partially in the suppression range 302 either has a Max_score lower than the block 304 containing the center score, or
has a Max_index indicating that the largest score in that block is not in the suppression range.

Referring again to FIG. 7D, the leftmost block 306 has one score (e.g., score 3) that is in the suppression range 302 and the rightmost block 308 has two scores (e.g., score 0 and score 1) that are in the suppression range 302. If Max_score of the leftmost block 306 (e.g., 40) is greater than the center score (e.g., 20) and Max_index for the leftmost block 306 equals 3, the center score is not declared the local maximum. If Max_score of the rightmost block 308 is greater than the center score and Max_index for the rightmost block 308 is 0 or 1, the center score is not declared the local maximum.

The third method cannot produce a false negative result. However, the third method may produce a false positive result. For example, if (as shown in FIG. 7D) the center score is 20, score 3 in the block 306 is 30, score 2 in the block 306 is 40, and all other scores are 10, then all three conditions of the third method are met:

The center score is the maximum within its block (e.g., the block 304), as indicated by Max_index, because the center score is 20 and the other scores in the block 304 are 10;
The block 304 that contains the center score has the highest maximum of all blocks that are fully in the suppression range 302, because all blocks fully in the suppression range 302 only have scores of 10; and
Any block partially in the suppression range has either
(1) a Max_score lower than the block 304 containing the center score, which is true of the rightmost block 308, which has scores equal to 10, or
(2) a Max_index indicating that the largest score in that block is not in the suppression range 302, which is true of the block 306, because Max_index refers to score 2, which is to the left of score 3 (score of 40 for score 2 versus score of 30 for score 3), and score 2 in block 306 is not in the suppression range 302.

The third method may produce a positive result (center score of 20 is the local maximum) even though there is a score in the suppression range that is higher (e.g., score 3 in block 306 with a score of 30).

A fourth method switches between the second (ambiguous positive) and the third (ambiguous negative) methods based on how many scores are in a block that is partially in the suppression range. For example, for each block that is partially in the suppression range:

If two or fewer scores are in the suppression range, use the ambiguous positive method;
Else use the ambiguous negative method.

Figure 8:
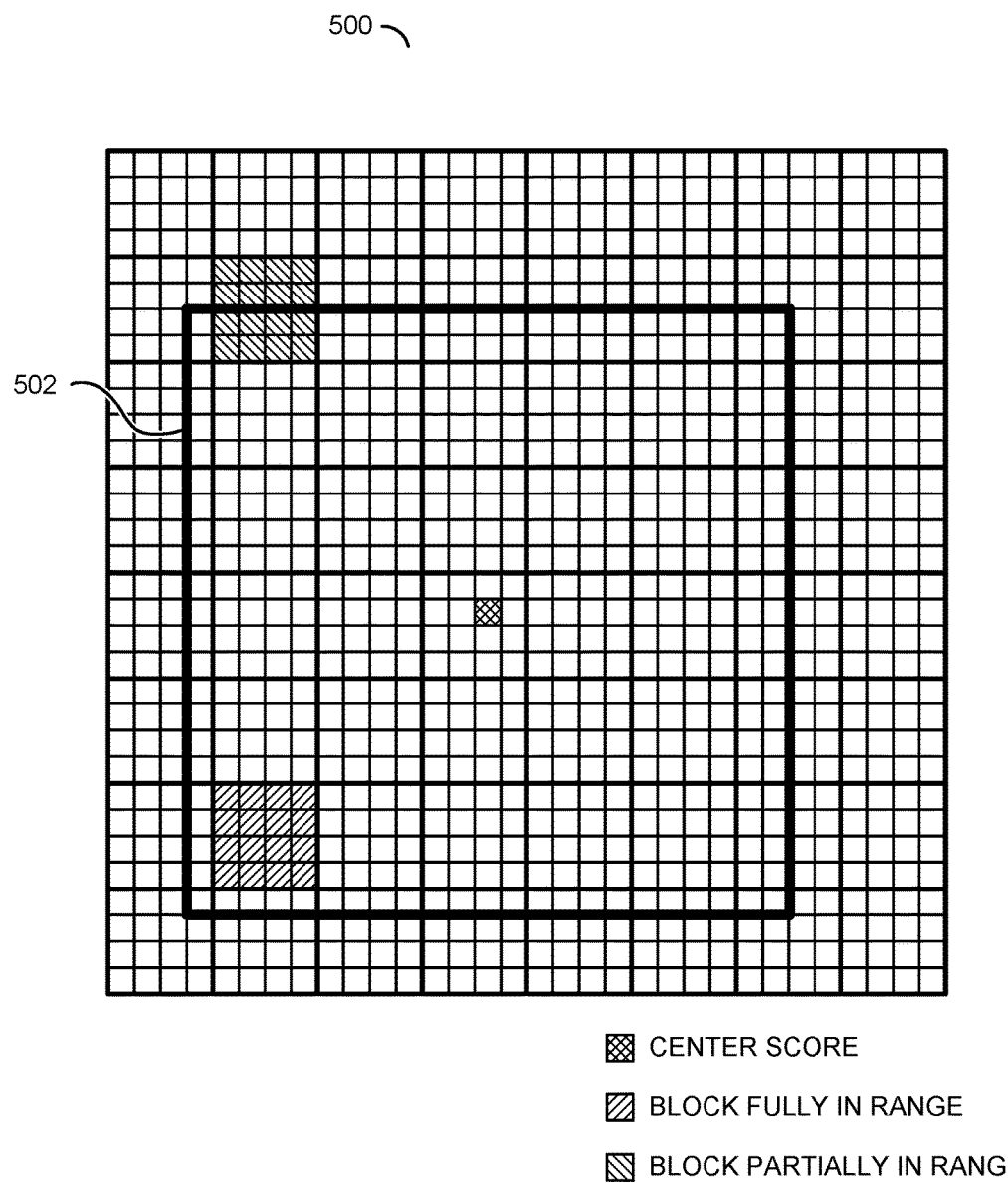
FIG. 8 is a diagram illustrating a multi-dimensional block-based approximate non-maximum suppression process using a two-dimensional array of scores.

The above methods may be extended to multiple dimensions with the blocks being multi-dimensional. Referring to FIG. 8, a diagram is shown illustrating a multi-dimensional reduced cost block based approximate non-maximum suppression process in accordance with an example embodiment of the invention. In the previous 1-D examples, a suppression range of 23 and a 1-D block size of 4 were used. In an example, a two-dimensional case may be illustrated where non-maximum scores in a score map 500 are to be suppressed in a 23×23 (+/−11×+/−11) suppression region 502 having a 2-D block size of 4×4.

As in the one-dimensional case, some blocks are fully inside the suppression region 502 and some blocks are only partially within the suppression region 502. A maximum score (e.g., Max_score) of a block fully inside the suppression region 502 will always cause the center score to be suppressed. A maximum score of a block only partially within the suppression region 502 may cause the center score to be suppressed, based, for example, on the various methods discussed above for the one dimensional case. Although illustrated for 1-dimensional and 2-dimensional arrays, block-based non-maximum suppression in accordance with an embodiment of the invention may be used in any number of dimensions. Moreover, the dimensions (size) of the blocks need not be equal to the dimensions of the data (e.g., scores, etc.). For example, 1-dimensional blocks may be utilized on 2-dimensional data.

The block-based non-maximum suppression schemes in accordance with embodiments of the invention generally result in cost savings because a majority of operations and memory accesses are performed on a per block basis rather than per score. For example, for 4×4 blocks and a suppression region of 23×23, even if all blocks that are partially within the suppression region are checked, comparisons need to be done to at most 7*7=49 max block scores, not 23*23=529 scores.

Besides reducing computation cost, computations associated with block-based non-maximum suppression schemes in accordance with embodiments of the invention may materially decrease memory and memory bandwidth demands. In the above example, each block is reduced from 16 scores to 1 score and 1 index. The index for 1 of 16 scores takes $\log_2(16)=4$ bits, and the amount of storage for each score depends on the particulars of the object or feature detection algorithm. The block information may be gathered as scores are generated, so that total storage demands are reduced. Accessing a smaller amount of data naturally leads to lower memory bandwidth and storage requirements.

When choosing the block size there is an inherent tradeoff between cost and computation time on the one hand and the degree to which the block based non-maximum suppression accurately approximates true (exact) non-maximum suppression. As discussed above, there may be ambiguity (possibly incorrect results) when scores that are inside blocks that are only partially in the suppression range may be larger than the current (local) score. In the example illustrated in FIG. 8, it is apparent that choosing a block size of 2×2 instead of 4×4 would result in many fewer possibilities of scores partially in the suppression range causing a false positive or false negative. However, instead of reducing 16 scores to 1 score and 1 index, only 4 scores are reduced to 1 score and 1 index, and the number of blocks that are in the suppression range or partially within the suppression range is increased to 12*12=144.

In various embodiments, block-based approaches in accordance with embodiments of the invention may also be used to perform exact non-maximum suppression. A purely block based scheme may determine whether the center score is larger than all the scores in blocks fully inside the suppression range. However, there will be ambiguity about scores in blocks that are only partially within the suppression range. An exact method may be implemented by using block-based calculations for blocks that are fully in the suppression range and looking at individual scores in blocks that are only partially within the suppression range. In general, the block based exact non-maximum suppression scheme in accordance with an example embodiment of the invention may implement a hybrid between block-based and individual-score based non-maximum suppression. Specifically, the current score is determined to be the local maximum if all of the following criteria are true:

(1) the current score is the maximum within its block, as indicated by Max_index;
(2) the block that contains the current score has the highest maximum of all blocks fully within the suppression range; and
(3) the current score is larger than all of the individual scores that are both in the suppression range and also in blocks that are only partially within the suppression range.

In the above scheme, the first two checks (criteria) use only block based information (maximum block scores, Max_scores, and Max_index), but the third check (criterion) looks at individual scores; hence, the method being considered a hybrid between block-based and individual-score-based non-maximum suppression. Compared to non-maximum suppression that is not block based, the first two steps save computation and bandwidth, because comparisons to a block of scores (e.g., those blocks that are fully inside the suppression range) are accomplished without reference to individual scores. Because the third check needs access to individual scores, the cost is higher than the purely block based approximate non-maximum suppression methods described above. The higher cost is due to (i) more computations (e.g., comparisons to more scores) and (ii) greater memory usage. Unlike the approximate (purely block based) methods, the exact (hybrid) method does not reduce storage by discarding individual scores after the block data is formed.

Figure 9:
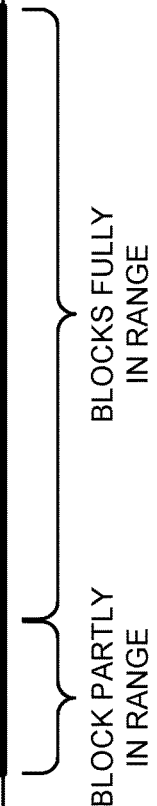
FIG. 9 is a diagram illustrating a method of reducing storage and computation costs.

Referring to FIG. 9, a diagram of a Table 1 is shown illustrating four cases of a reduced cost block-based exact non-maximum suppression process in accordance with an example embodiment of the invention. Table 1 illustrates an example with a 1-D block size of 2 and a suppression range of 9 (+/−4). In all four cases shown, the center score is 4 and is the maximum in the center block. The center score is on the right side of the center block (e.g., score 1), so the two blocks to the right of the center block and the block to the left of the center block are fully within the suppression range, whereas the block to the left of the block to the left of the center block (marked partly in range) has one score within the suppression range (e.g., score 1) and one score outside of the suppression range (e.g., score 0).

In cases 1 and 2, a block fully in range has a maximum score of 7, which is enough to mean that the center score is not the maximum score. In cases 1 and 3, score 1 of the leftmost block has a value of 9, and is the only score that is both within the suppression range and in a block that is only partially within the suppression range, which is enough to mean that the center score is not the maximum score. In case 4, the center score is (i) greater than the maximum scores of all of the blocks fully within the suppression range and (ii) greater than the score that is both within the suppression range and in a block that is only partially within the suppression range. Thus, the center score is the maximum score.

In a first variation on the block based exact non-maximum suppression method described above, the first criterion that the current score is the maximum within its block, as indicated by Max_index, may be replaced by a determination whether the current score is the maximum within its block, as determined by checking all scores in the block or by comparing to the maximum score. With this variation, there is no need to compute or store "Max_index".

In a second variation on the block based exact non-maximum suppression method described above, the third criterion that the current score is larger than all of the individual scores in blocks that are only partially within the suppression range may be replaced by doing the following for each block that is only partially within the suppression range:

Check whether the current score is larger than the Max_score of the block, and, if not, check if the current score is larger than each individual score within the suppression range.

The second variation is typically faster (since if the comparison to the Max_score passes, no other checks need to be performed). However, the second variation may be slower in the worst case compared to the first method, where the comparison to the maximum is just an extra check.

Figure 10:
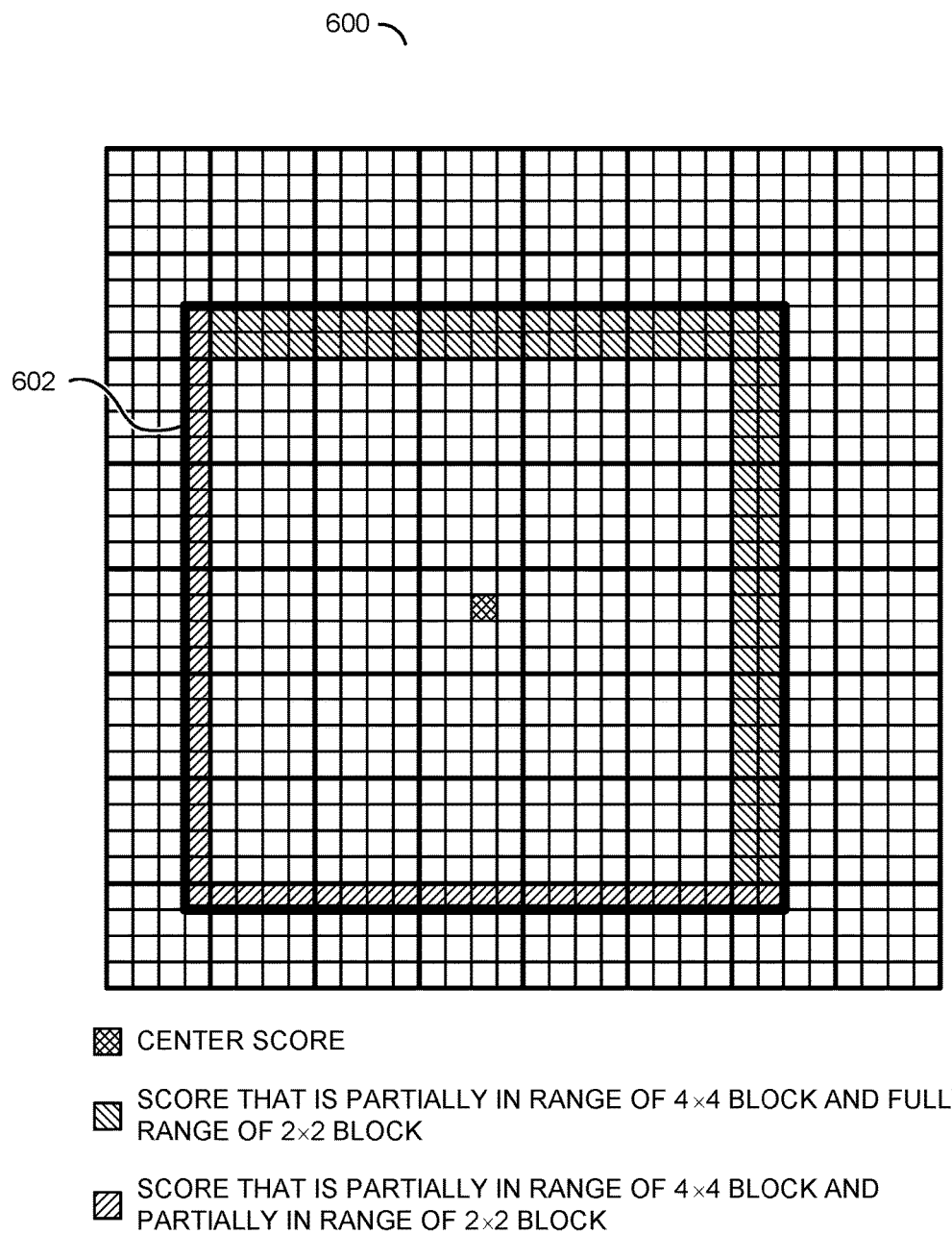
FIG. 10 is a diagram illustrating another method using two block sizes.

Referring to FIG. 10, a diagram is shown illustrating another example multi-dimensional reduced cost block based approximate non-maximum suppression process in accordance with an example embodiment of the invention. In FIG. 10, a third variation is illustrated using a score map 600 and a suppression range 602. In the third variation, two block sizes (e.g., K1 and K2) are used to determine local maximums for the score map 600: a larger size block (K1) and a smaller size block (K2). Max_score and Max_index values are computed for both the larger and smaller block sizes. The blocks are than processed using a two-level method. A current score is the maximum if:

the current score is the maximum within its K1 block, as indicated by Max_index for the K1 block;
the K1 block that contains the current score has the highest maximum (Max_score) of all K1 blocks fully within the suppression range 602;
the current score is larger than all Max_score values of the K2 blocks that are fully within the suppression range 602; and
the current score is larger than all of the individual scores that are both within the suppression range 602 and also in K2 blocks that are only partially within the suppression range 602.

In an example where K1=4×4 and K2=2×2, for the scores that are in K1 blocks that are only partially within the suppression range 602 there are (i) twenty-one K2 (2×2) blocks, representing 84 scores, that are fully within the suppression range and forty-five scores that are in K2 blocks that are only partially within the suppression range. Thus, there are a total of 84+45=129 scores that are in K1 blocks not fully within the suppression range. With the first method all 129 need to be checked. With the two-level method, only twenty-one K2 blocks and 45 individual scores, for 66 checks, are performed.

In additional variations, more than two levels may be used; for example, three levels with, K1=8×8, K2=4×4, and K3=2×2. In additional variations, the smaller blocks may have different shapes (dimensions) without the number of scores in one block shape being bigger than another block shape. For example, in an implementation where blocks K1=4×4, K2=2×2, K3A=2H×1V, and K3B=1H×2V are used, the following comparisons would be needed using the above example:

21 comparisons for K2 (2×2) blocks;
11 comparisons for K3A (2H×1V) blocks;
11 comparisons for K3B (1H×2V) blocks; and
1 comparison for a score that is not in any
K1, K2, K3A or K3B blocks that are fully in the suppression range, for a total of 21+11+11+1=44 comparisons for scores that are not in K1 blocks that are fully within the suppression range.

Figure 11:
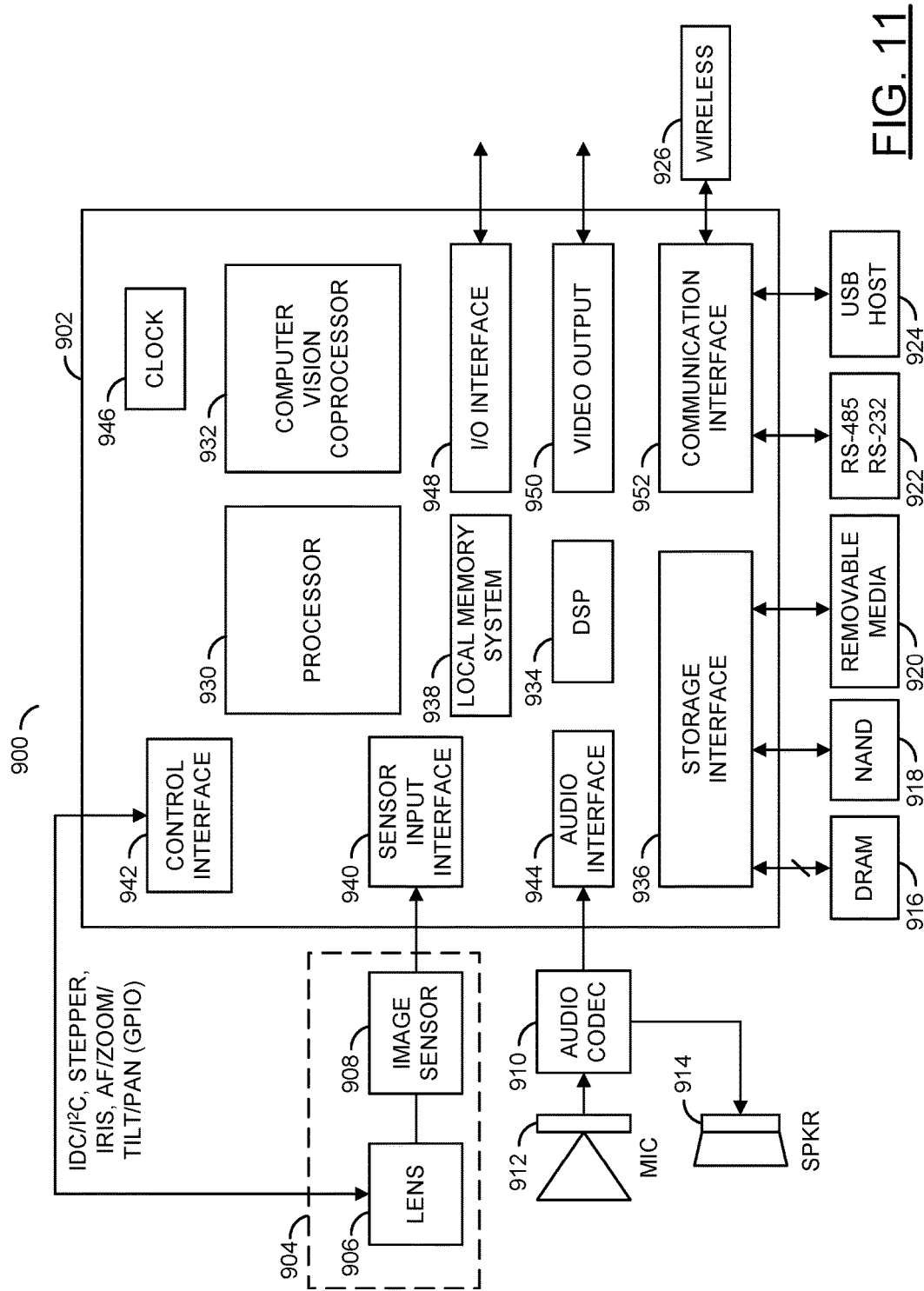
FIG. 11 is a diagram illustrating a camera system incorporating an approximate non-maximum suppression process in accordance with an example embodiment of the invention.

Referring to FIG. 11, a diagram of a camera system 900 is shown illustrating an example implementation of a computer vision system in accordance with an embodiment of the invention. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 9.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera 60. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera 60.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a block (or circuit) 930, a block (or circuit) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The circuit 930 may be a processor circuit. In various embodiments, the circuit 930 may include one or more embedded processors (e.g., ARM, etc.). The circuit 932 may be may be a computer vision coprocessor circuit. The circuit 934 may be a digital signal processing (DSP) module. In some embodiments, the circuit 934 may implement separate image DSP and video DSP modules. The circuit 936 may be a storage interface. The circuit 936 may interface the processor/camera circuit 902 with the DRAM 916, the non-volatile memory 918, and the removable media 920.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by the processor 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, the processor 930 and/or the coprocessor 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 934 may be configured to send/receive audio data. In one example, the audio interface 944 may implement an audio inter-IC sound (I²S) interface. The audio interface 944 may be configured to send/receive data in a format implemented by the Audio coder 904.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 952 may also include support for communicating using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

The functions and structures illustrated in the diagrams of FIGS. 1 to 11 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of improving object or feature detection using a processor circuit comprising the steps of:
   receiving an array of scores; and
   applying a block based non-maximum suppression technique comprising (i) dividing said array of scores into blocks of two or more scores and (ii) computing per-block information using one or more data paths of said processor circuit, wherein said data paths are implemented with a plurality of hardware circuits.

2. The method according to claim 1,
   wherein:
   said array of scores corresponds to a portion of pixels of an image containing one or more objects or features; and
   said scores represent a likelihood that a corresponding pixel is a reference point for a region of a predetermined size containing a particular object or feature.

3. The method according to claim 2, wherein said region is rectangular in shape and said reference point is an upper-left corner of said region.

4. The method according to claim 1, wherein said block based non-maximum suppression technique suppresses scores that are below a determined local maximum score based on a predefined suppression region.

5. The method according to claim 1, wherein said blocks are multi-dimensional.

6. The method according to claim 1, wherein computing said per-block information comprises:
   identifying a maximum score for each of said blocks.

7. The method according to claim 6, wherein computing said per-block information comprises:
   identifying a location within each of said blocks containing said maximum score.

8. The method according to claim 7, wherein said block based non-maximum suppression technique provides an approximate non-maximum suppression.

9. The method according to claim 8, wherein said approximate non-maximum suppression comprises:
   using block-based calculations to determine whether a center score of a predefined suppression region is the maximum within the block containing the center score based on said per block information identifying the location within each of said blocks containing said maximum score;
   using block-based calculations to determine whether the block that contains the center score has a highest maximum of all blocks that are either fully within the predefined suppression region or have a predefined number of scores within the predefined suppression region based on per block information indicating the maximum score of each block; and
   designating the center score as a local maximum when both of the above determinations are true.

10. The method according to claim 8, wherein said approximate non-maximum suppression comprises:
    using block-based calculations to determine whether a center score of a predefined suppression region is the maximum within the block containing the center score based on said per block information identifying the location within each of said blocks containing said maximum score;
    using block-based calculations to determine whether the block that contains the center score has a highest maximum of all blocks that are either fully or partially within the predefined suppression region based on per block information indicating the maximum score of each block; and
    designating the center score as a local maximum when both of the above determinations are true.

11. The method according to claim 8, wherein said approximate non-maximum suppression comprises:
    using block-based calculations to determine whether a center score of a predefined suppression region is the maximum within the block containing the center score based on said per block information identifying the location within each of said blocks containing said maximum score;
    using block-based calculations to determine whether the block that contains the center score has a highest maximum of all blocks fully within the predefined suppression region based on per block information indicating the maximum score of each block fully within the predefined suppression region;
    using block-based calculations to determine whether any block partially within the predefined suppression region either (i) has per block information indicating the maximum score of the block is lower than the block containing the center score or (ii) has per block information identifying the location within the block containing a largest score is not within the predefined suppression region; and
    designating the center score as a local maximum when all of the above determinations are true.

12. The method according to claim 8, wherein said approximate non-maximum suppression comprises:
(A) using block-based calculations to determine whether a center score of a predefined suppression region is the maximum within the block containing the center score based on said per block information identifying the location within each of said blocks containing said maximum score;
(B) using block-based calculations to determine whether the block that contains the center score has a highest maximum of all blocks that are fully within the predefined suppression region based on per block information indicating the maximum score of each block;
(C) for each block that is only partially within the predefined suppression region,
if a number of scores in a respective block that are in the predefined suppression region is greater than a predefined threshold, using block-based calculations to determine whether the block that contains the center score has a higher maximum than the respective block based on per block information indicating the maximum score of each block, or
if the number of scores in the respective block that are in the predefined suppression region is not greater than the predefined threshold, using block-based calculations to determine whether the respective block either (a) has per block information indicating the maximum score of the respective block is lower than the block containing the center score or (b) has per block information identifying the location within the respective block containing a largest score is not within the predefined suppression region; and
(D) designating the center score as a local maximum when all of the above determinations are true.

13. The method according to claim 7, wherein said block based non-maximum suppression technique provides an exact non-maximum suppression.

14. The method according to claim 13, wherein said exact non-maximum suppression comprises:
using block-based calculations to determine whether a center score of a predefined suppression region is the maximum within the block containing the center score based on said per block information identifying the location within each of said blocks containing said maximum score;
using block-based calculations to determine whether the block that contains the center score has a highest maximum of all blocks fully within the predefined suppression region;
using score-based calculations to determine whether the center score is larger than all individual scores that are both in the predefined suppression region and also within blocks that are only partially within the predefined suppression region; and
designating the center score as a local maximum when all of the above determinations are true.

15. The method according to claim 1, further comprising: storing said per block information instead of said scores.

16. The method according to claim 15,
wherein said per block information includes at least one of (i) a maximum score for at least one block or (ii) a location of a maximum score for at least one block.

17. An apparatus comprising:
a processor configured to generate a command to run a block based non-maximum suppression; and
a coprocessor configured to (i) receive said command from said processor, (ii) receive an array of scores, (iii) parse said array of scores into a data flow including one or more operators, (iv) schedule said operators in one or more data paths (iv) divide said array of scores into blocks of two or more scores by processing said array of scores using said one or more data paths, (v) compute per-block information using said one or more data paths, and (vi) compute local maxima position information for said array of scores by performing block based non-maximum suppression based on said per-block information using said one or more data paths, wherein (a) said data paths are implemented with a plurality of hardware engines, (b) said hardware engines operate in parallel to each other, and (c) said coprocessor is implemented solely in hardware.

18. The apparatus according to claim 17, further comprising a common memory configured by said processor as (i) one or more input data structures that provide said array of scores to said coprocessor and (ii) one or more output data structures that receive one or more of said per-block information or said local maxima position information from said coprocessor.

19. The apparatus according to claim 17, wherein said processor and said coprocessor form part of a digital camera.

* * * * *